United States Patent [19]

Takimoto et al.

[11] Patent Number: 5,115,324

[45] Date of Patent: May 19, 1992

[54] INFORMATION SIGNAL RECORDING APPARATUS PERFORMING A CUEING FUNCTION

[75] Inventors: Hiroyuki Takimoto; Mikihiro Fujimoto, both of Yokohama, Japan

[73] Assignee: Nancy Seith, Chester Township, Meigs, Ohio

[21] Appl. No.: 439,689

[22] Filed: Nov. 21, 1989

[30] Foreign Application Priority Data

Nov. 30, 1988 [JP] Japan .................. 63-304855

[51] Int. Cl.$^5$ ............................ H04N 5/782
[52] U.S. Cl. ............................ 358/335; 358/906; 360/14.1; 360/72.2; 369/47

[58] Field of Search ................ 358/335, 906, 22; 360/33.1, 13, 14.1, 14.2, 72.1, 72.2, 69; 369/83, 47, 48

[56] References Cited

U.S. PATENT DOCUMENTS 4,175,267 11/1979 Tachi ........................ 358/319
4,587,580 5/1986 Takayama et al. .
4,612,569 9/1986 Ichinose ........................ 358/22

Primary Examiner—Robert L. Richardson
Attorney, Agent, or Firm—Forrest Collins

[57] ABSTRACT

A recording apparatus for recording an information signal on a recording medium has a timer for automatically renewing the date, and circuitry for providing a mark on the recording medium when recording starts after the date is changed by the timer.

18 Claims, 7 Drawing Sheets

| FIG. 1A | FIG. 1B |

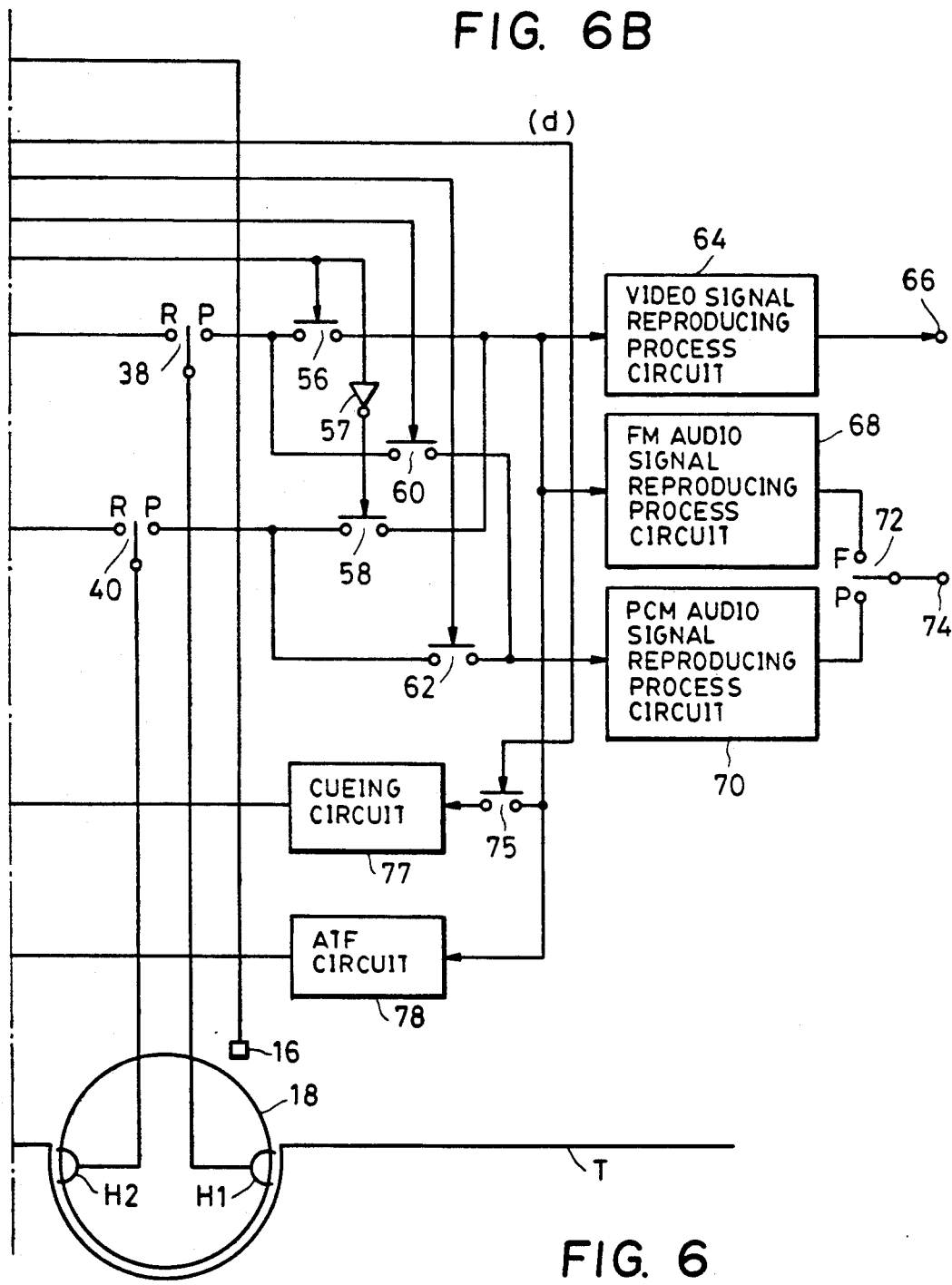

5,115,324

INFORMATION SIGNAL RECORDING APPARATUS PERFORMING A CUEING FUNCTION

BACKGROUND OF THE INVENTION

1. Field of the Invention

This invention relates to an information signal recording apparatus, and more particularly, to an information signal recording apparatus capable of performing so-called cueing.

2. Description of the Prior Art

Heretofore, in apparatuses for recording and reproducting audio signals, video signals and the like, there have been known apparatuses having a so-called cueing function in which a mark signal for cueing has been recorded at a position corresponding to a recording-start portion or a leading portion of a program. The mark signal is searched for at high speed when reproducing, and reproduction is started from a portion corresponding to the mark signal.

In video cassette recorders (VCR's), for example, there have been known (1) a method in which a cueing mark signal is recorded on a helical track as digital data, (2) a method in which a cueing mark signal is recorded on a track provided in the longitudinal direction of a tape other than a helical track, (3) a method in which a low-frequency analog signal is multiplexed on a helical track as a cueing mark signal, and the like.

On the other hand, it is known that the recording timing for the mark signal is set to both the moment when recording is started and the moment when a predetermined writing button is operated.

In camcorders (a camcorder is a VCR incorporated in a camera) which have recently become popular, however, since photographing time is short, an interval between adjacent mark signals becomes too short. Furthermore, since too many mark signals are recorded on one roll of tape, an extremely long time is required for cueing to a desired picture frame.

On the other hand, providing a dedicated track for mark signals, or recording a dedicated signal as a mark signal results in large circuit scale, which prevents a small and light recording apparatus from being produced.

SUMMARY OF THE INVENTION

It is an object of the present invention to solve the problems described above.

It is another object of the present invention to provide an information signal recording apparatus capable of recording mark signals with intervals which are convenient for retrieval.

These objects are accomplished, according to one aspect of the present invention, by an information signal recording apparatus comprising (a) timing means for automatically renewing a date, (b) recording means for recording an information signal, (c) control signal generation means for generating a control signal in accordance with a first start of recording of the information signal by the recording means after the renewal of the date by the timing means, and (d) marking means for providing a mark on a recording medium in response to the control signal.

It is still another object of the present invention to provide an information signal recording apparatus which does not require a dedicated recording area or a dedicated signal for retrieval.

This object is accomplished, according to one aspect of the present invention, by an information signal recording apparatus comprising (a) means for inputting an information signal, (b) pilot signal generation means for generating a pilot signal for tracking control, (c) recording means for recording the information signal and the pilot signal by sequentially forming a plurality of tracks which are parallel to one another on a recording medium, (d) control signal generation means for generating a control signal for providing an indication on the recording medium, and (e) marking means for controlling the generation timing of the pilot signal so that the size of a region in which the pilot signal is recorded on each track is different from the size for another period in response to the control signal.

These and other objects and features of the present invention will become more apparent from the following detailed description of the preferred embodiments.

DETAILED DESCRIPTION OF THE PREFERRED EMBODIMENTS

The embodiments of the present invention will now be explained with reference to the drawings.

Figure 1A:
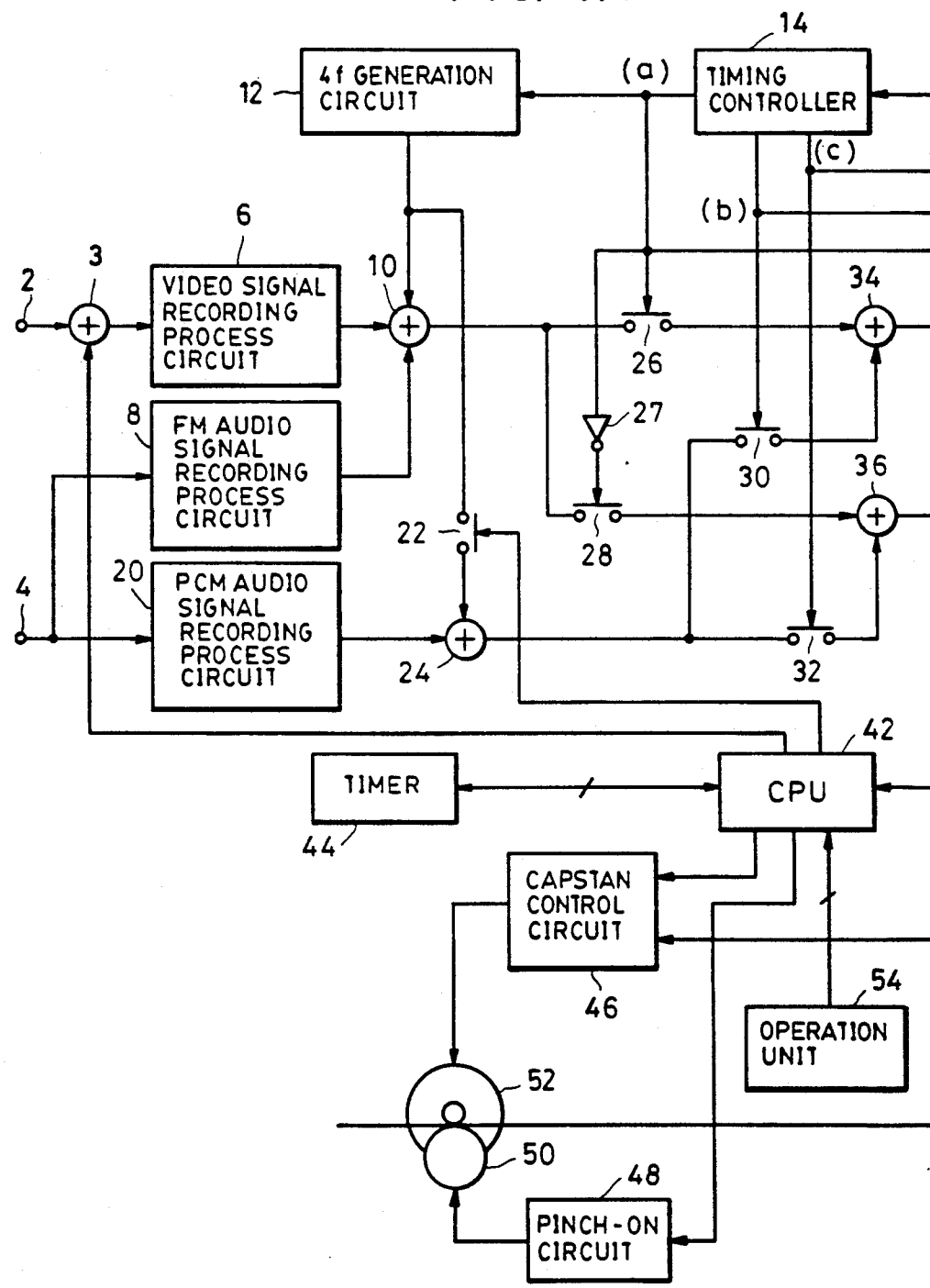
FIG. 1, composed of FIGS. 1A and 1B, is a diagram showing the main configuration of a recorder unit of a camcorder in an embodiment of the present invention.
Figures 1, 1B:
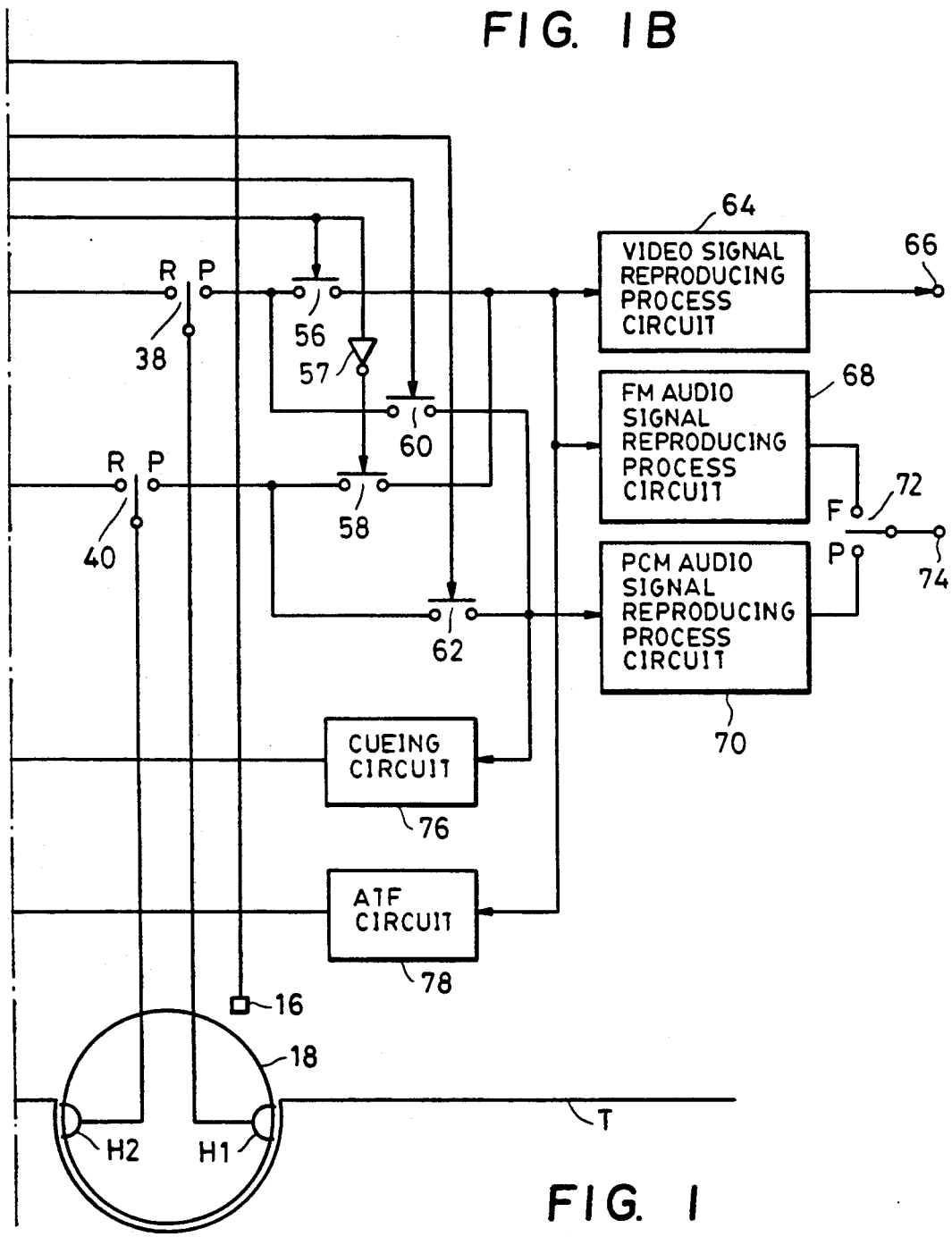

FIG. 1 is a diagram showing the schematic configuration of a recorder unit of a camcorder in a first embodiment of the present invention.

First, recording and reproducing of normal video signals and audio signals will be explained. A video signal from a camera (not illustrated) is input to a video signal recording process circuit 6 via a terminal 2 and an adder 3 which adds date characters which will be described later. A luminance signal of the video signal is subjected to FM modulation and a carrier chrominance signal of the video signal is frequency-converted into a low-frequency region in the circuit 6, and subsequently supplied to an adder 10. On the other hand, an audio signal from a microphone (not illustrated) is input to an FM audio signal recording process circuit 8 from a terminal 4, subjected to FM modulation in the circuit 8, and subsequently frequency-multiplexed in a band between the FM-modulated luminance signal and the low-frequency carrier chrominance signal by the adder 10. On the other hand, from a 4 f (four frequency) generation circuit 12, 4 kinds of pilot signals for tracking control using a well-known 4 frequency method are sequentially input to the adder 10, and frequency-multiplexed in a frequency region which is further lower than the carrier chrominance signal. A first recording signal including a video signal is thus output from the adder 10.

On the other hand, the audio signal from the terminal 4 is subjected to PCM (pulse code modulation) by a PCM audio signal recording process circuit 20, subjected to time-base compression, and is output as a second recording signal via an adder 24.

Figure 2:
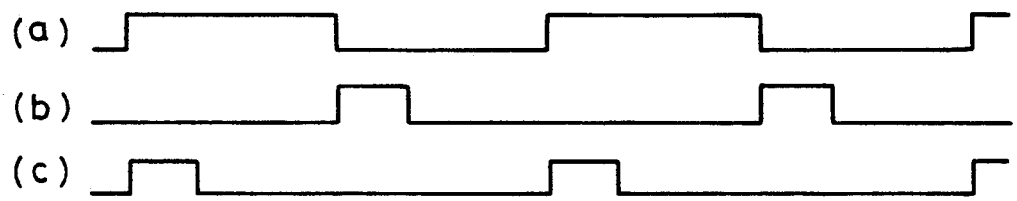
FIG. 2, consisting of (a)-(c), is a timing chart showing timing signals which a timing controller in FIG. 1 outputs.
Figure 3:
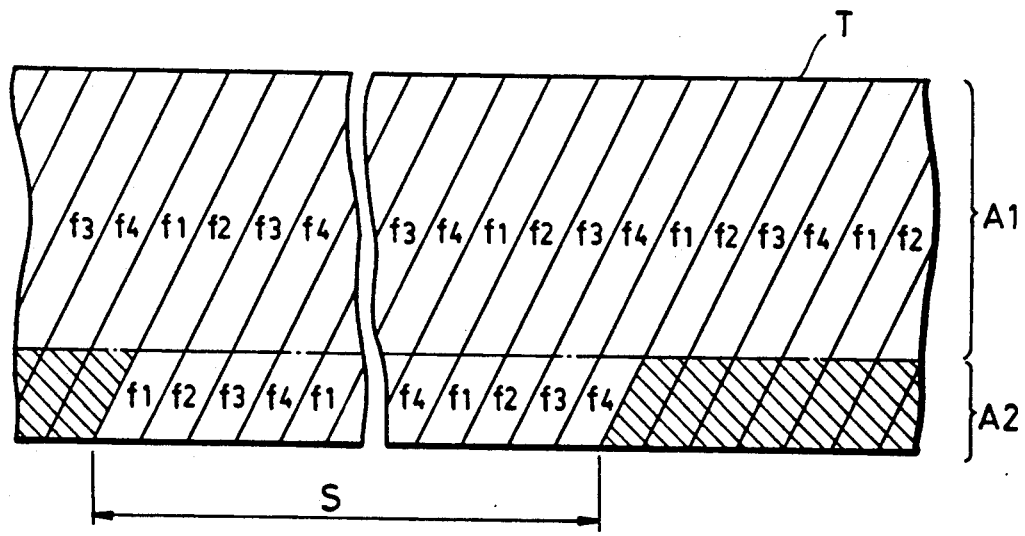
FIG. 3 is a diagram showing patterns recorded by the camcorder in FIG. 1.

The rotational phase of a rotary cylinder 18 provided with rotating heads H1 and H2 is detected by a detector 16, a phase detection signal (PG) of which is input to a timing controller 14. The timing controller 14 outputs rectangular timing signals (shown as (a), (b) and (c) in FIG. 2) having a frequency which is equal to the rotational frequency of the rotating heads H1 and H2 in accordance with the PG signal. A timing signal shown in (a) in FIG. 2 is supplied to the 4 f generation circuit 12, and determines the switching timing of 4 kinds of pilot signals. The timing signal (a) is also supplied to a switch 26 and to a switch 28 via an inverter 27, and alternately switches on the switches 26 and 28. The first recording signal is alternately supplied to adders 34 and 36 in accordance with switching of the switches 26 and 28. Switches 38 and 40 are connected to R when recording, and the first recording signal is recorded in region A1 (shown in FIG. 3) on a magnetic tape T by the rotating heads H1 and H2.

On the other hand, the second recording signal is supplied via the adder 24 to the adders 34 and 36 via switches 30 and 32 which are controlled by timing signals (b) and (c) (shown in FIG. 2), and is recorded in region A2 (shown in FIG. 3) on the magnetic tape T by the heads H1 and H2.

When reproducing, the switches 38 and 40 are connected to P, and signals reproduced from the above-described region A1 are gated by switches 56 and 58 which are controlled by the timing signal (a) and its inverted signal (inverted by an inverter 57), and are supplied to a video signal reproducing process circuit 64, an FM audio signal reproducing process circuit 68 and a tracking control (ATF) circuit 78 as a continuous signal.

The video signal reproducing process circuit 64 converts the signals reproduced from the region A1 to the form of a television signal, which is output from an output terminal 66. An audio signal which has been FM-demodulated by the FM audio signal reproducing process circuit 68 is supplied to a terminal F of a switch 72. The ATF circuit 78 separates a pilot signal from among the signals reproduced from the region A1, performs a well-known tracking signal processing according to the pilot signal, and supplies a capstan control circuit 46 with a tracking error signal indicating the tracking error of the reproducing heads H1 and H2 on the region A1. The capstan control circuit 46 controls the rotation of a capstan 52 to perform tracking control.

On the other hand, signals reproduced from the above-described region A2 are supplied to a PCM audio signal reproducing process circuit 70 via switches 60 and 62 which are controlled by the timing signals (b) and (c). The circuit 70 restores the PCM audio signal to its original analog audio signal, which is supplied to a terminal P of the switch 72. The switch 72 is properly switched according to the preference of the user, and an FM-demodulated audio signal or a PCM-decoded audio signal is output from a terminal 74.

Next, recording of a mark signal for cueing and cueing using the mark signal according to the present invention will be explained.

The camcorder of the present embodiment uses a timer for an autodating mechanism for recording the date, and a mark signal is recorded on the tape T at the moment when recording is first started after changing the date.

Figure 4:
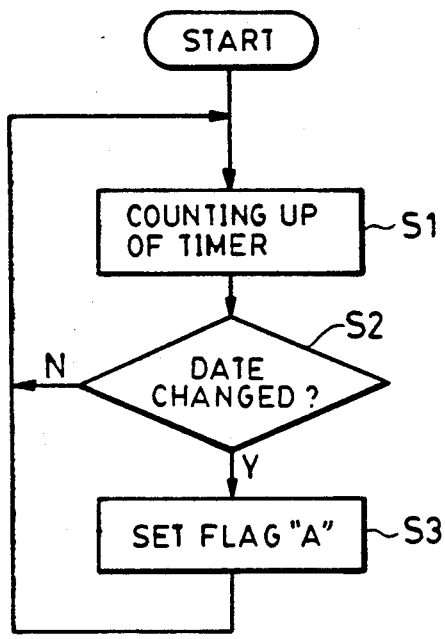
FIG. 4 is a flow chart showing the timer control operation carried out by a CPU in the camcorder shown in FIG. 1.

A CPU 42 functions in accordance with the operation of an operation unit 54. The control of a timer 44 by the CPU 42 will be explained using the flow chart shown in FIG. 4. "Start" in FIG. 4 is performed when power from a power supply is first applied for the timer 44 and the CPU 42, and the operation according to the flow chart is continued until power from the power supply is cut off.

By counting up the timer (step S1), the timer 44 renews (refreshes) timer information, such as the date, time and the like. Such timer information is returned to the CPU 42, which functions in accordance with the operation of the operation unit 54. A date-character signal can be supplied to the adder 3 according to a date-recording instruction by the operation unit 54.

If the date is changed during the counting up by the timer 44 (step S2), the CPU 42 sets a cueing flag (flag A) in its internal memory (step S3). The flag A is automatically reset when a date cueing mark signal has been recorded.

Figure 5:
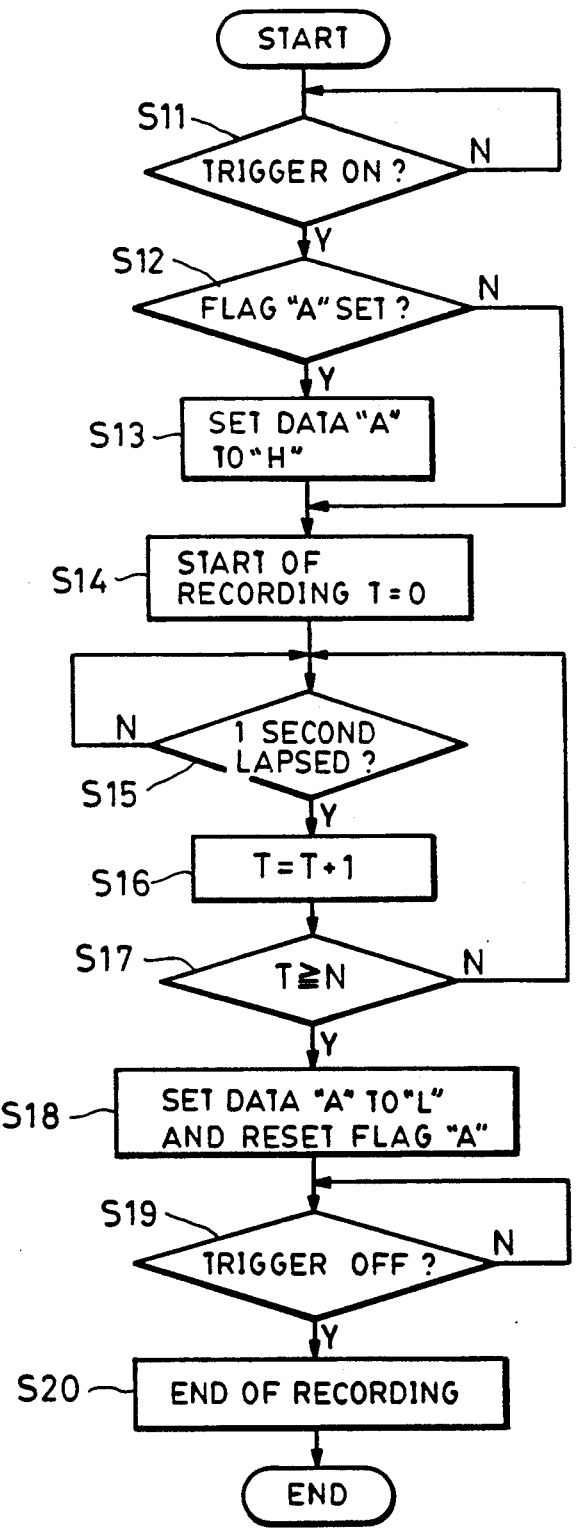
FIG. 5 is a flow chart for explaining the operation of the CPU when the camcorder in FIG. 1 performs recording.

FIG. 5 is a flow chart showing the operation of the CPU 42 in a recording standby state and during a recording operation. In the camcorder of the present embodiment, after power from the power supply has been applied, a recording standby state (recording-pause state) is provided by the operation of a picture recording button within the operation unit 54. "Start" and "end" in the flow chart in FIG. 5 are in the recording standby state.

When a recording trigger switch within the operation unit 54 is switched on (step S11), it is confirmed whether or not the above-described flag A is set (step S12). When the flag A is set, cueing data (data A) which are control data for a switch 22 are set to "H" (a high level) (step S13). In the recording standby state, the switches 38 and 40 are connected to R, and the capstan 52 is rotated at a predetermined speed by the capstan control circuit 46. When the recording trigger switch is then switched on, recording of signals is commenced by starting the carrying of the tape T by pressing a pinch roller 50 against the capstan 52 by the operation of a pinch-on circuit 48 (step S14).

When recording is started, the first and second recording signals are recorded in the regions A1 and A2, respectively, as described above. If the data A are "H", the switch 22 is switched on. Hence, the above-described pilot signal is recorded not only in the region A1, but also in the region A2. Every time 1 second has lapsed after the start of the recording (step S15), 1 is added to a variable T (step S16). When the variable T reaches a predetermined number N (step S17), the data A are set to "L" (a low level) to switch off the switch 22 and reset the flag A (step S18).

That is, if the flag A is set, the switch 22 is switched on for N seconds after the start of recording, and a pilot signal is recorded also in the region A2 only during this period. A section shown by S in FIG. 3 indicates a period during which the switch 22 is switched on. A signal recorded in the region A2 within this section thereby functions as a mark signal for cueing.

When the trigger switch is switched off during recording (step S19), the CPU 42 terminates recording by stopping the carrying of the tape T by releasing the pressing of the pinch roller 50 against the capstan 52 by the operation of the pinch-on circuit 48 and the switching on of a reel brake (not illustrated) (step S20), and the apparatus returns to its recording standby state.

Even if recording is subsequently started by switching on the trigger switch before changing the date, the data A remains "L". Hence, recording of the pilot signal in the region A2 is not performed.

When a cueing instruction is provided by the operation unit 54, the CPU 42 connects the switches 38 and 40 to P, has the pinch-on circuit 48 press the pinch roller 50 against the capstan 52, and has the capstan control circuit 46 rotate the capstan 52 at high speed, to carry the tape T at high speed. At this time, the switches 60 and 62 output reproduced signals from the region A2 by the heads H1 and H2 in accordance with the timing signals (b) and (c), and the cueing circuit 76 detects whether or not the pilot signal is included within outputs from the switches 60 and 62. When the heads H1 and H2 trace the section S in FIG. 3, the pilot signal appears in outputs from the switches 60 and 62. The cueing circuit 76 detects the pilot signal and supplies the CPU 42 with a detection signal. The CPU 42 receives the detection signal and sets the apparatus to the abovedescribed normal reproducing mode or stop mode. Cueing for a recording-start portion for each date is thereby completed.

According to the camcorder of the embodiment as described above, since a mark signal for cueing is not recorded for each recording, but only for a recording-start portion at each date, the situation wherein an interval between adjacent mark signals is too short does not occur. Accordingly, the camcorder is very convenient to use when cueing a desired program, that is, it is possible to retrieve the desired program in a short time. Furthermore, since detection of the change of the date is performed using a timer for performing date recording, dedicated hardware is not particularly required.

In addition, recording of a mark signal is performed by recording a pilot signal for tracking control in the region A2 for a few seconds. No particular dedicated circuit for cueing or a dedicated recording region are required except the switch 22. Hence, the circuit configuration does not become complicated, which is very advantageous for providing a small, light and low-cost camcorder.

Next, another embodiment of the present invention will be explained.

Figure 6A:
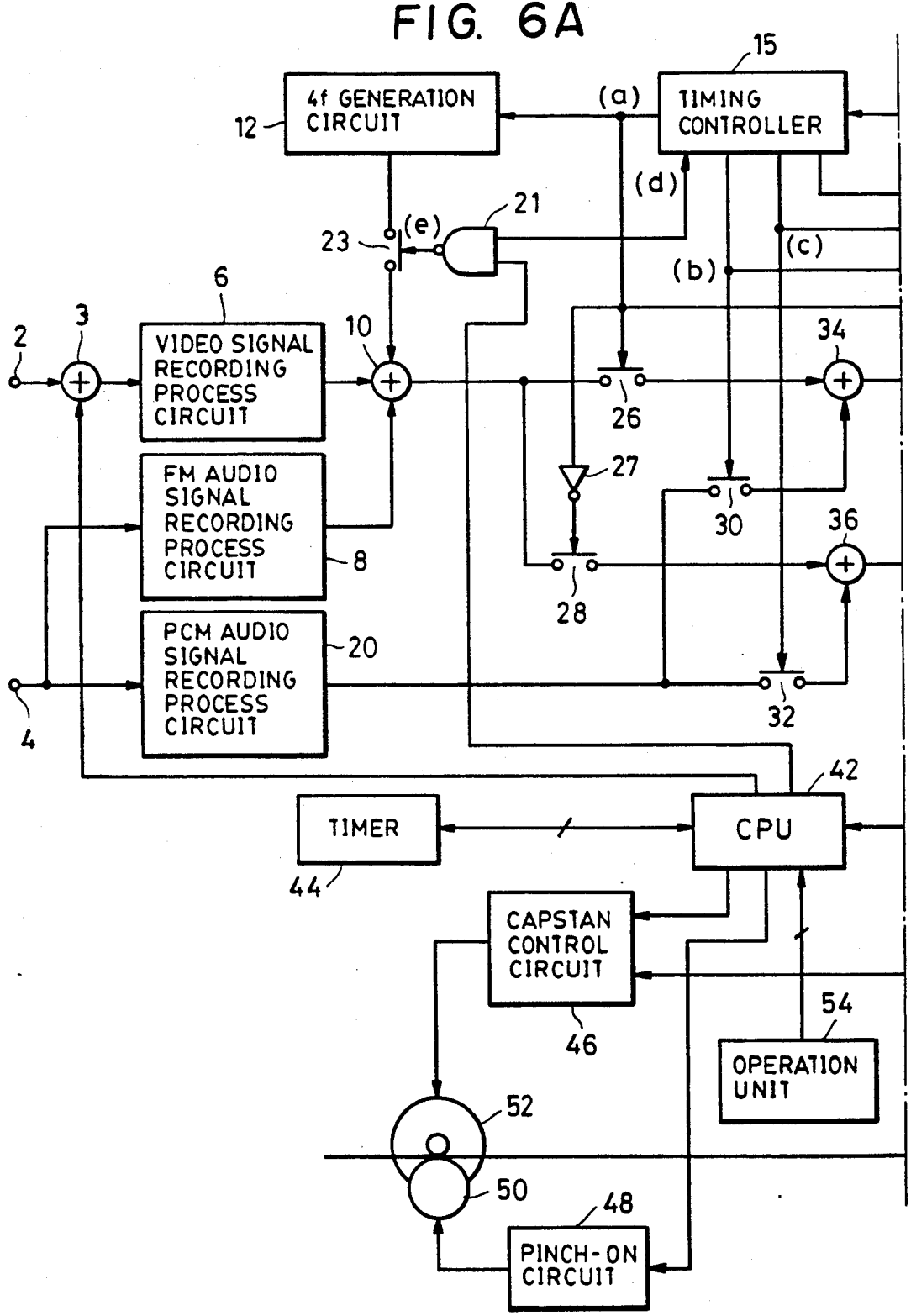
FIG. 6, composed of FIGS. 6A and 6B, is a diagram showing the main configuration of a recorder unit of a camcorder in another embodiment of the present invention.

FIG. 6 is a diagram showing the schematic configuration of a recorder unit of a camcorder according to another embodiment of the present invention. In FIG. 6, components like those in FIG. 1 are indicated by like numerals.

Figure 7:
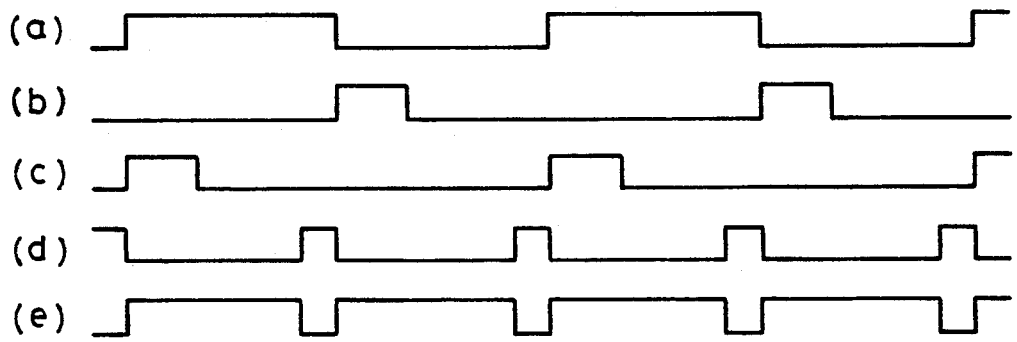
FIG. 7, consisting of (a)-(e), is a timing chart showing timing signals which a timing controller in FIG. 6 outputs.

The operation of the camcorder in FIG. 6 in normal recording and reproducing is totally identical to that of the camcorder in FIG. 1. The operation when recording a mark signal for cueing also conforms to the flow chart in FIG. 5 like the camcorder in FIG. 1. The data A are supplied, however, to one input of a NAND gate 21. To another input of the NAND gate 21, a timing signal shown in (d) in FIG. 7 is supplied in synchronization with the PG signal. When the data A are "H", a signal inverted from the timing signal (d) (shown in (e) in FIG. 7) is provided as a control signal for a switch 23.

Since the NAND gate 23 supplies the switch 23 with an output "H" when the data A are "L", the switch 23 is usually switched on. The switch 23 is switched off only when the data A are "H" for a period during which the heads H1 and H2 trace near the ends of the tracks.

Figure 8:
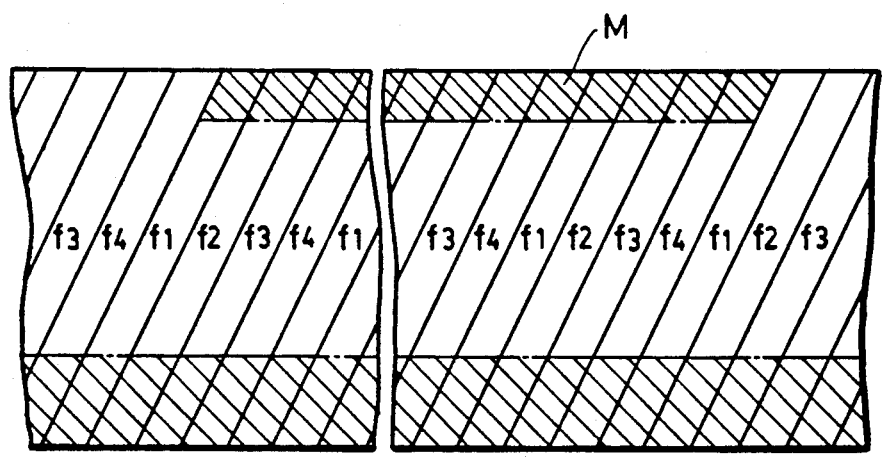
FIG. 8 is a diagram showing patterns recorded by the camcorder in FIG. 6.

The pilot signal is thereby not recorded at end portions of the tracks only for a predetermined period (N seconds) from the initial start of recording after changing the date, as shown by M in FIG. 8. The portion where the pilot signal is not recorded functions as a mark signal for cueing.

At the moment of cueing, the timing signal (d) is supplied to a switch 75, and output signals from the switches 56 and 58 for a period during which the heads H1 and H2 trace the end portions of respective tracks are supplied to a cueing circuit 77. The cueing circuit 77 detects, during the output of the switch 75, that the pilot signal is not included for a predetermined period (for not less than a period during which the heads H1 and H2 rotate 180°), and supplies the CPU 42 with a detection signal. The CPU 42 executes cueing by setting the apparatus to a normal reproducing mode or a stop mode in accordance with the detection signal. It is to be noted that the ATF circuit 78 can output a tracking error signal which is sufficient to control the rotation of the capstan 52, even if the pilot signal is not recorded on end portions of the tracks as described above.

In the above-described embodiment of FIG. 6, effects similar to those in the embodiment in FIG. 1 are obtained. That is, since cueing is performed only for a recording-start portion for each date, the apparatus is very convenient to use. Furthermore, since a mark signal for cueing is provided by not recording the pilot signal for tracking control on a part of each track for a few seconds, a dedicated mark signal generator and a dedicated recording region are unnecessary. This is advantageous for providing a small, light and low-cost apparatus.

Although the above-described embodiments have been explained with respect to VCR's, the present invention is not limited thereto, but can also be applied to apparatuses such as audio tape recorders, cinecameras, and the like.

As explained above, according to the information signal recording apparatus of the present invention, mark signals for cueing are not excessively recorded, and it is possible to realize cueing which can promptly perform retrieval of recorded signals and which is very convenient to use.

Furthermore, it is unnecessary to provide a dedicated circuit and a dedicated recording region for cueing mark signals. Hence, it is possible to provide a small, light and low-cost apparatus.

The individual components shown in outline or designated by blocks in the Drawings are all well-known in the signal recording art and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the present invention is intended to cover various modifications included within the spirit and scope of the appended claims. The scope of the following claims is to be accorded the broadest interpretation so as to encompass all such modification and equivalent structures and functions.

What is claimed is:

1. An information signal recording apparatus comprising:
   (a) timing means for automatically renewing date information;
   (b) recording means for recording an information signal;
   (c) control signal generation means for generating a control signal at a first instance of recording said information signal by said recording means after the renewal of the date information by said timing means; and
   (d) means for providing a mark on a recording medium in response to said control signal.

2. An apparatus according to claim 1, wherein said control signal generation means comprises means for setting a control flag when the date information is renewed by said timing means, and means for generating said control signal for a predetermined period of time after a start of recording by said recording means when said control flag is set.

3. An apparatus according to claim 1, further comprising means for inputting a first video signal as said information signal, means for generating a second video signal corresponding to the renewed date information output by said timing means, and means for supplying said recording means with said second video signal and said first video signal mixed together.

4. An apparatus according to claim 1, further comprising means for inputting the information signal, pilot signal generation means for generating a pilot signal, and means for supplying said recording means with said pilot signal and said information signal mixed together.

5. An apparatus according to claim 4, wherein said means for providing a mark switches a generation timing of the pilot signal generated by said pilot signal generation means for a predetermined period of time in response to said control signal, from generation timing having a different period.

6. An apparatus according to claim 5, wherein said recording means records said information signal by sequentially forming a plurality of tracks which are parallel to one another, and wherein said means for providing a mark controls the generation timing of the pilot signal generated by said pilot signal generation means so that, for said predetermined period of time, a dimension of a region in which said pilot signal is recorded on each track is different from the dimension for said another period.

7. An apparatus according to claim 1, further comprising detection means for detecting said mark, carrying means for supporting said recording medium, and retrieval means for controlling said carrying means in accordance with the detection of said mark by said detection means.

8. An apparatus according to claim 7, wherein said retrieval means switches a driving speed of said carrying means from a first speed to zero or to a second speed which is lower than said first speed in accordance with the detection of said mark by said detection means.

9. An information signal recording apparatus comprising:
   (a) means for inputting an information signal;
   (b) pilot signal generation means for generating a pilot signal for tracking control;
   (c) recording means for recording said information signal and said pilot signal by sequentially forming a plurality of tracks which are parallel to one another on a recording medium;
   (d) control signal generation means for generating a control signal for providing an indication on said recording medium; and
   (e) means for controlling a generation timing of said pilot signal so that a dimension of a region on said recording medium in which said pilot signal is recorded on each track is different from the dimension of another period in response to said control signal.

10. An apparatus according to claim 9, wherein each track includes a first region in which said information signal is recorded and a second region which is smaller than said first region, and wherein said means for controlling controls said pilot signal generation means so that said pilot signal is recorded in said first region and in said second region for a predetermined period of time corresponding to said control signal, and so that the pilot signal is recorded in said first region but is not recorded in said second region for said another period.

11. An apparatus according to claim 10, wherein said information signal includes a video signal, and wherein said video signal is recorded in said first region on each track by said recording means.

12. An apparatus according to claim 11, further comprising means for inputting an audio signal, and wherein said recording means records said audio signal in said second region.

13. An apparatus according to claim 12, further comprising first signal-processing means for converting said input audio signal into a first signal form suitable for recording, second signal-processing means for converting said input audio signal into a second signal form suitable for recording, and wherein the audio signal having said first signal form is recorded in said first region, and the audio signal having said second signal form is recorded in said second region.

14. An apparatus according to claim 9, wherein each track includes a predetermined region in which said information signal is recorded, and wherein said means for controlling controls said pilot signal generation means so that the pilot signal is not recorded in a part of said predetermined region for a predetermined period of time in accordance with said control signal and the pilot signal is recorded in the entire region of said predetermined region for said another period.

15. An apparatus according to claim 14, wherein said information signal includes a video signal, and said video signal is recorded in said predetermined region on each track by said recording means.

16. An apparatus according to claim 9, further comprising reproducting means for reproducing said information signal and said pilot signal from said recording medium, and tracking control means for controlling a relative position between said reproducing means and said recording medium according to the pilot signal reproduced by said reproducing means.

17. An apparatus according to claim 16, further comprising detection means for detecting tracks having a different size of the region in which said pilot signal is recorded according to the pilot signal reproduced by the reproducing means, carrying means for supporting said recording medium, and retrieval means for controlling a driving speed of said recording medium by said carrying means in accordance with an output of said detection means.

18. An apparatus according to claim 17, wherein said tracking control means controls the driving of said recording medium by said carrying means.

* * * * *

UNITED STATES PATENT AND TRADEMARK OFFICE
CERTIFICATE OF CORRECTION

PATENT NO. : 5,115,324

DATED : May 19, 1992

INVENTOR(S) : Takimoto et al.

It is certified that error appears in the above-identified patent and that said Letters Patent is hereby corrected as shown below:

ON THE TITLE PAGE:

AT [73] Assignee:

"Nancy Seith, Chester Township, Meigs, Ohio" should read --Canon Kabushiki Kaisha, Tokyo, Japan--.

AT [56] References Cited:

Insert --4,366,545 12/1982 Kawanabe; 4,608,705 8/1986 Tanaka--.

AT [56] Attorney, Agent or Firm:

"Forrest Collins" should read --Fitzpatrick, Cella, Harper & Scinto--.

COLUMN 5

Line 32, "abovedescribed" should read --above-described--.

UNITED STATES PATENT AND TRADEMARK OFFICE
CERTIFICATE OF CORRECTION

PATENT NO. : 5,115,324

DATED : May 19, 1992

INVENTOR(S) : Takimoto et al.

It is certified that error appears in the above-identified patent and that said Letters Patent is hereby corrected as shown below:

COLUMN 6

Line 4, "NAND gate 23" should read --NAND gate 21--.

COLUMN 7

Line 3, "modification" should read --modifications--.

Signed and Sealed this

Second Day of November, 1993

Attest:

BRUCE LEHMAN

Attesting Officer

Commissioner of Patents and Trademarks